US011799967B1

(12) United States Patent
Lott (10) Patent No.: US 11,799,967 B1
(45) Date of Patent: Oct. 24, 2023

(54) ULTRA-WIDE BAND COMMUNICATION SYSTEM FOR AUGMENTED REALITY

(71) Applicant: Meta Platforms Technologies, LLC, Menlo Park, CA (US)

(72) Inventor: William Lott, San Francisco, CA (US)

(73) Assignee: Meta Platforms, Inc., Menlo Park, CA (US)

(*) Notice: Subject to any disclaimer, the term of this patent is extended or adjusted under 35 U.S.C. 154(b) by 39 days.

(21) Appl. No.: 17/559,748

(22) Filed: Dec. 22, 2021

(51) Int. Cl.
*H04L 67/131* (2022.01)
*H04B 1/719* (2011.01)
*H04B 17/27* (2015.01)
*H04B 17/318* (2015.01)

(52) U.S. Cl.
CPC ........... *H04L 67/131* (2022.05); *H04B 1/719* (2013.01); *H04B 17/27* (2015.01); *H04B 17/318* (2015.01); *H04B 2201/71634* (2013.01)

(58) Field of Classification Search
CPC ....... H04L 67/131; H04B 1/719; H04B 17/27; H04B 17/318; H04B 2201/71634
USPC .......................................................... 375/130
See application file for complete search history.

(56) References Cited

U.S. PATENT DOCUMENTS

| | | | |
|---|---|---|---|
| 2014/0306866 A1* | 10/2014 | Miller | G06T 7/73 345/8 |
| 2020/0106877 A1* | 4/2020 | Ledvina | H04L 9/30 |
| 2022/0201428 A1* | 6/2022 | Ertan | G06F 21/44 |

* cited by examiner

*Primary Examiner* — Fitwi Y Hailegiorgis
(74) *Attorney, Agent, or Firm* — BakerHostetler (57) ABSTRACT

There is provided a system configured to perform location-aware augmented reality tasks utilizing software and/or hardware components. For example, and not by limitation, a general embodiment may include an AR system. The system may include an ultra-wide band (UWB) communication system configured to estimate location information. The UWB system can include a memory and a processor which when executing instructions from the memory is configured to perform operations consistent with location-aware AR applications. For instance, the operations may include receiving a first UWB signal, the first UWB signal including information comprising fiducial data associated with a device transmitting the first UWB signal.

20 Claims, 5 Drawing Sheets

ULTRA-WIDE BAND COMMUNICATION SYSTEM FOR AUGMENTED REALITY

FIELD

This disclosure relates generally to communication systems used in augmented reality (AR) and virtual reality (VR) applications.

BACKGROUND

Established wireless standards such as Near Field Communication (NFC) and Bluetooth Low Energy (LE) offer the possibility of enabling Internet of Things (IoT) applications in which many different devices can be configured to engage in wireless communications. These protocols leverage advances in electronics miniaturization and make use of compact devices that can be embedded at a system's front-end to provide connectivity.

While these technologies have widely adopted in many IoT applications, they are limited in the features they can enable in augmented reality (AR) and virtual reality (VR) applications. For instance, these protocols have significant transceiver overhead, their security can be compromised, and it can be difficult to estimate distance and angle information between two devices that utilize these protocols because they are prone to interference. As such, to enable next-generation AR and VR applications, there is a need for improved communication systems and methods for realizing device secure and energy-efficient device connectivity.

SUMMARY

The embodiments featured herein help solve or mitigate the aforementioned mentioned issues relating to the state-of-the-art. The embodiments make use of ultra-wide band (UWB) technology to enable fast, secure, and energy efficient communication. Specifically, UWB communication systems offer the possibility to provide highly accurate directionality information over short ranges chiefly because time-of-flight or other operations typically used for distance estimation are more accurate if the transmitted signal has a large bandwidth, a condition inherent to UWB communication. Furthermore, because UWB can be transmitted at low power, interference with other systems that utilize the radio spectrum is negligible.

One exemplary embodiment is configured to perform location-aware augmented reality tasks utilizing software and/or hardware components. For example, and not by limitation, a general embodiment may include an AR system. The system may include a UWB communication system configured to estimate location information. The UWB system can include a memory and a processor which when executing instructions from the memory is configured to perform operations consistent with location-aware AR applications. For instance, and not by limitation, the operations may include receiving a first UWB signal, the first UWB signal including information comprising fiducial data associated with a device transmitting the first UWB signal.

In yet another embodiment, a system includes a memory and processor configured to perform certain operations when executing instructions from the memory. These operations may include receiving a message indicative of a profile specific to a user of the system, and configuring, based on the message, a UWB communication module of the system such that the system nay be discoverable by another device. Furthermore, the operations may include updating, in response to the configuring, a virtual representation of a location of the system to include the system. The operations can further include causing the UWB communication module of the system to broadcast a UWB identification signal. The system may be communicatively coupled to an AR system, and the virtual representation may be generated by the AR system. The UWB identification signal can include an identifier specific to the user of the system.

Another embodiment includes a system having a memory and processor which, when executing instructions from the memory, is configured to perform certain operations. These operations can include receiving a first UWB signal from a device communicatively coupled with the system, the first UWB signal including an identifier of the device. The operations can further include determining whether the first UWB signal includes data indicating that the device is allowed to initiate a communication with the system. Furthermore, in response to the device being allowed to communicate the system, the operations can include receiving a second UWB signal from the device, the second UWB signal including an audio signal. The operations can further include activating an audio module of the system and playing the audio signal on the audio module.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

A UWB radio system generally comprises a transmitter, a receiver, and a data processing system. The UWB radio system may further include associated channels (media) for the propagation of UWB radiation, and the UWB radio system may further include radiation scattering objects. A UWB radio system may be defined according to several approaches. In a first example approach, suitable for communications systems, a UWB radio system may be characterized by a pulsed transmission and based on estimating a fractional bandwidth of the radiation pulse, as defined below according to Equation 1.

$$\eta = 2\frac{f_H - f_L}{f_H + f_L} \quad (1)$$

where $f_H$ and $f_L$ are, respectively, the higher and the lower boundary frequency of the pulse spectrum at a level of −10 dB. For example, and not by limitation, a UWB radiation may be defined as the pulse radiation having fractional bandwidth of $\eta \geq 2$ and frequency bandwidth $\geq 500$ MHz. In contrast, a radiation with the fractional bandwidth of $\eta < 0.01$ is a narrowband radiation, and a radiation with $0.01 \leq \eta < 0.2$ as wideband radiation.

In yet another example approach which further classifies types of UWB radiation with more granularity, a UWB radio system may be defined according to the use of ratio bandwidth $b = f_H/f_L$, which can be expressed in terms of a fractional bandwidth, as shown in Equation 2.

$$b = \frac{(2 + \eta)}{(2 - \eta)} \quad (2)$$

Based on this approach, there may be four distinct spectral bands. The first band is a narrow band (b<1.01), the second band is a moderate band (1.01≤b≤3), the third band is an ultra-moderate band (3<b≤10), and the fourth band is a hyperband (b>10). The first band mentioned above is consistent with the previous definition for narrow band radiation ($\eta$<0.01), and the second, third, and fourth bands are associated with ultra-wideband radiation.

By way of example, signals classified as UWB radiation may be categorized in several way. For example, a UWB signal may be frequency-modulated, phase-modulated, or noise-like (chaotic) signals. In another category, a UWB signal may consist of trains of radio frequency pulses of different central frequency, i.e., the signal may be time-frequency modulated. In yet another category, a UWB signal may be a short electromagnetic pulse containing no radio frequency carrier.

UWB communication systems can be characterized according to their rate of information transmission or simply their information rate. This rate, according to Shannon's theory, is proportional to the bandwidth of a transmitted signal. For example, by current established standards, UWB communication systems may use three frequency ranges. These ranges are from about 3.1-10.6 GHz, with a spectral density below −41.3 dBm/MHz, 57-66 GHz, and 275-300 GHz.

Based on these ranges, several communication paradigms can be used to establish UWB communication between two devices. A first exemplary communication modality is a single-band UWB modality which includes three lines related to the frequency ranges 3.1-10.6, 3-5, and 6-10 GHz, respectively. In this modality, the whole of an allocation band may be used with the first line. Usage of this band confers specific requirements for the receiving and transmitting antennas.

Specifically, in this modality the frequency band is wider than about 7.5 GHz, which allows an antenna to radiate or receive a UWB pulse of 150-200 picoseconds (ps) duration. Each of the three lines mentioned above may be subdivided in smaller narrow single bands for the purpose of relaxing antenna requirements. This may yield a communication modality that utilizes longer pulse duration.

In another communication modality, communication between two devices may be achieved according to a multi-band UWB scheme where the entire frequency band (7.5 GHz) is subdivided in 14 sub-bands having a width of 528 MHz. This approach allows the utilization of combinations of sub-bands to optimize operation and minimize power consumption.

In yet another communication modality, dynamic or chaotic oscillations may be used as a data carrier. In such a scheme, pulse-amplitude modulation may be used as a means for putting information in a chaotic signal. Without limitation and by example only, chaotic oscillators in the 0.35-3.5 GHz range may be used to produce chaotic oscillations for a UWB communications application.

Figure 1:
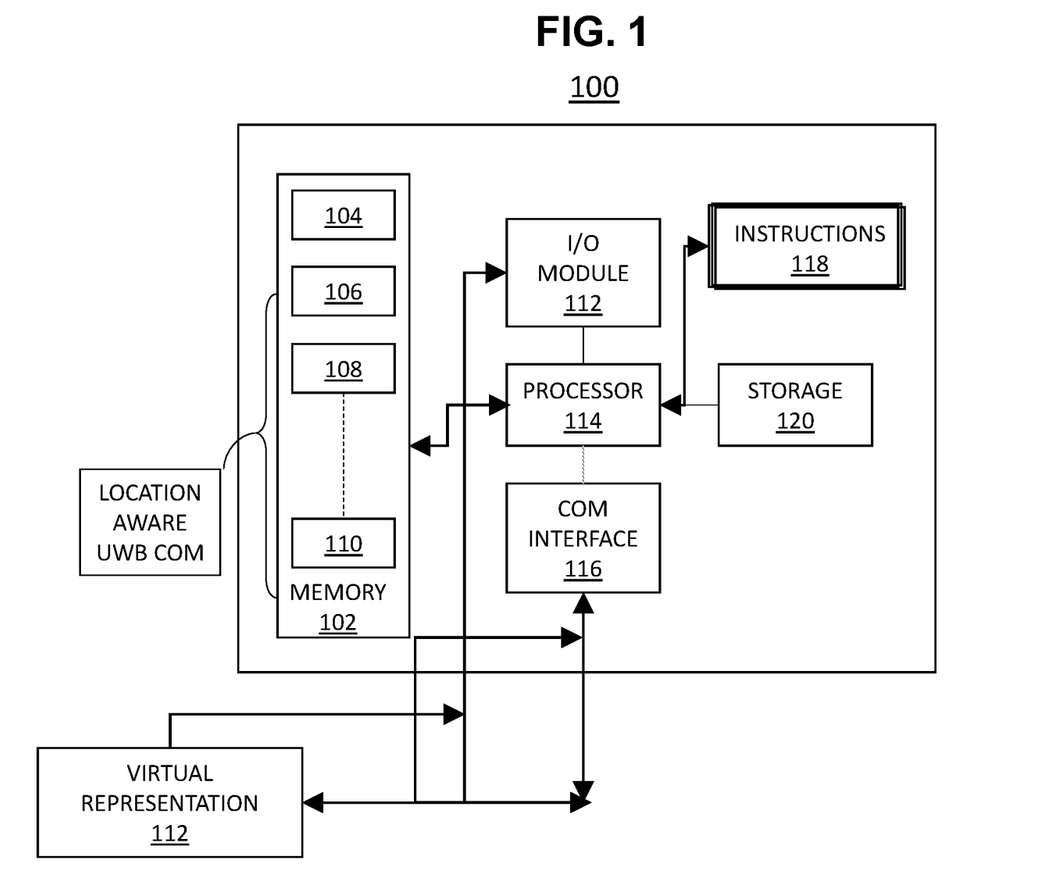
FIG. 1 illustrates a system for location aware UWB communication within an AR framework.

FIG. 1 depicts an exemplary system 100 that may be used to implement location-aware augmented reality applications based on UWB communication, in accordance with the embodiments. The system 100 includes an application-specific processor 114 configured to perform task specific location-aware augmented reality applications. The processor 114 has a specific structure imparted by instructions stored in a memory 102 and/or by instructions 118 that can be fetched by the processor 114 from a storage 120. The storage 120 may be co-located with the processor 114, or it may be located elsewhere and communicatively coupled to the processor 114 via a communication interface 116.

The system 100 can be a stand-alone programmable system, or it can be a programmable module located in a much larger system. For example, the system 100 may be part of a distributed system configured to handle the various modules of an AR system. The processor 114 may include one or more hardware and/or software components configured to fetch, decode, execute, store, analyze, distribute, evaluate, and/or categorize information.

Furthermore, the processor 114 can include an input/output module (I/O module 112) that can be configured to receive or send data to or from one or more communicatively coupled UWB-enabled devices. The processor 114 may also include one or more processing devices or cores (not shown). In some embodiments, the processor 114 may be a plurality of processors, each having either one or more cores. The processor 114 can be configured to execute instructions fetched from the memory 102, i.e. from one of memory block 104, memory block 106, memory block 108, and memory block 110.

Furthermore, without loss of generality, the storage 120 and/or the memory 102 may include a volatile or non-volatile, magnetic, semiconductor, tape, optical, removable, non-removable, read-only, random-access, or any type of non-transitory computer-readable computer medium. The storage 120 may be configured to log data processed, recorded, or collected during the operation of the processor 114. The data may be time-stamped, location-stamped, cataloged, indexed, or organized in a variety of ways consistent with data storage practice. The storage 120 and/or the memory 102 may include programs and/or other information that may be used by the processor 114 to perform tasks consistent with those described herein.

For example, the processor 114 may be configured by instructions from the memory block 106, the memory block 108, and the memory block 110, to perform location aware UWB-based operations. These operations may be codified in the memory 102 as instructions, and the instructions may include receiving a first UWB signal via an antenna of the system 100. The first UWB signal may include information comprising fiducial data associated with another device, which is transmitting the first UWB signal.

The operations may further include estimating, based on the first UWB signal, a location of the device transmitting the first UWB signal. Furthermore, the operations may include generating location information including the determined location and the fiducial data. Moreover, the operations can include registering the location information in a virtual representation 112 of an area comprising the AR system and the device transmitting the first UWB signal.

Figure 2:
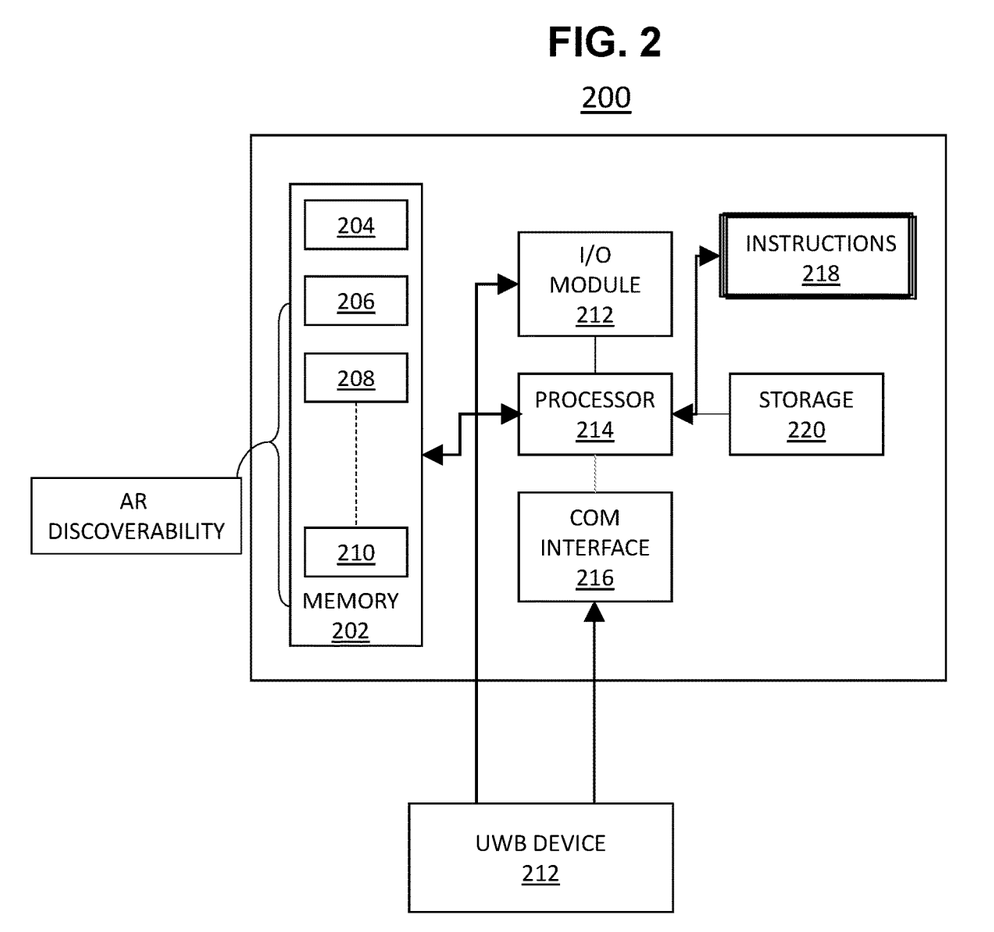
FIG. 2 illustrates a system for AR discoverability utilizing UWB communications.

FIG. 2 depicts a system 200 that may be used to implement opt-in AR discoverability in a system configured to perform UWB communication. The system 200 includes an application-specific processor 214 configured to perform tasks relating to UWB and AR discoverability. The processor 214 has a specific structure imparted by instructions stored in a memory 202 and/or by instructions 218 that can be fetched by the processor 214 from a storage 220. The storage 220 may be co-located with the processor 214, or it may be located elsewhere and be communicatively coupled to the processor 214 via a communication interface 216.

The system 200 can be a stand-alone programmable system, or it can be a programmable module located in a much larger system. For example, the system 200 may be part of a distributed system configured to handle the various modules of an AR system. The processor 214 may include one or more hardware and/or software components configured to fetch, decode, execute, store, analyze, distribute, evaluate, and/or categorize information.

Furthermore, the processor 214 can include an I/O module 212 configurable to receive and/or transmit data to or from one or more UWB-enabled communicatively coupled devices. The processor 214 may include one or more processing devices or cores (not shown). In some embodiments, the processor 214 may be a plurality of processors, each having either one or more cores. The processor 214 can be configured to execute instructions fetched from the memory 202, i.e. from one of memory block 204, memory block 206, memory block 206, and memory block 210.

Furthermore, without loss of generality, the storage 220 and/or the memory 202 may include a volatile or non-volatile, magnetic, semiconductor, tape, optical, removable, non-removable, read-only, random-access, or any type of non-transitory computer-readable computer medium. The storage 220 may be configured to log data processed, recorded, or collected during the operation of the processor 214. The data may be time-stamped, location-stamped, cataloged, indexed, or organized in a variety of ways consistent with data storage practice. The storage 220 and/or the memory 202 may include programs and/or other information that may be used by the processor 214 to perform tasks consistent with those described herein.

For example, the processor 214 may be configured by instructions from the memory block 206, the memory block 208, and/or the memory block 210, to perform opt-in discoverability based on UWB communication. These operations may be codified in the memory 202 as instructions, and the instructions may include receiving a message indicative of a profile specific to a user of the system 200 The operations may further include configuring, based on the message, an ultra-wideband (UWB) communication module of the system 100 such that the system 100 is discoverable by another UWB communication system of a communicatively coupled UWB device 212.

Figure 3:
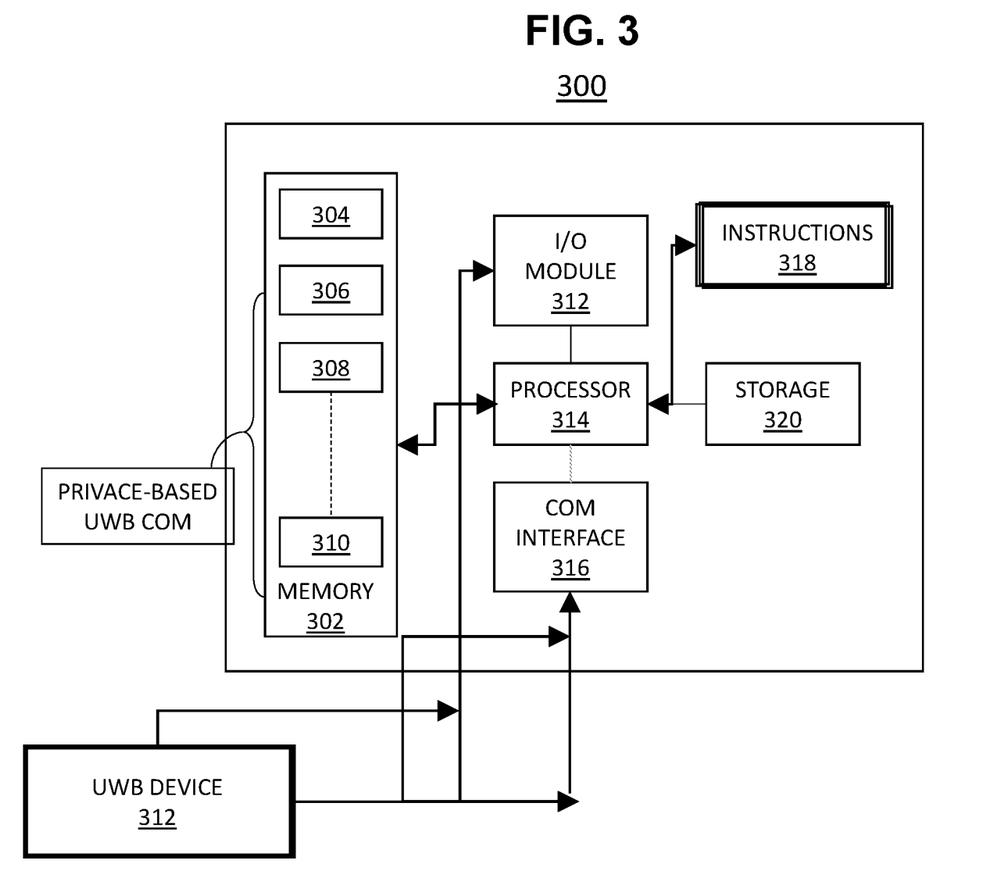
FIG. 3 illustrates an AR system for authentication based on UWB communications.

FIG. 3 depicts a system 300 that may be used to implement privacy based UWB communication for AR systems. The system 300 includes an application-specific processor 314 configured to perform tasks relating to UWB and AR discoverability. The processor 314 has a specific structure imparted by instructions stored in a memory 302 and/or by instructions 318 that can be fetched by the processor 314 from a storage 320. The storage 320 may be co-located with the processor 314, or it may be located elsewhere and be communicatively coupled to the processor 314 via a communication interface 316.

The system 300 can be a stand-alone programmable system, or a programmable module located in a much larger system. For example, the system 300 may be part of a distributed system configured to handle the various modules of an AR system. The processor 314 may include one or more hardware and/or software components configured to fetch, decode, execute, store, analyze, distribute, evaluate, and/or categorize information.

Furthermore, the processor 314 can include an I/O module 312 that can be configured to receive and/or transmit data to or from one or more UWB-enabled communicatively coupled devices. The processor 314 may include one or more processing devices or cores (not shown).

In some embodiments, the processor 314 may be a plurality of processors, each having either one or more cores. The processor 314 can be configured to execute instructions fetched from the memory 302, i.e. from one of memory block 304, memory block 306, memory block 308, and memory block 310.

Furthermore, without loss of generality, the storage 320 and/or the memory 302 may include a volatile or non-volatile, magnetic, semiconductor, tape, optical, removable, non-removable, read-only, random-access, or any type of non-transitory computer-readable computer medium. The storage 320 may be configured to log data processed, recorded, or collected during the operation of the processor 314. The data may be time-stamped, location-stamped, cataloged, indexed, or organized in a variety of ways consistent with data storage practice. The storage 320 and/or the memory 302 may include programs and/or other information that may be used by the processor 314 to perform tasks consistent with those described herein.

For example, the processor 314 may be configured by instructions from the memory block 306, the memory block 308, and the memory block 310, to perform privacy-based AR discoverability and communication based on UWB connectivity. These operations may be codified in the memory 302 as instructions, and the instructions may include receiving a UWB signal from a communicatively coupled UWB device 312, the communicatively coupled device being associated a user. The operations may further include determining whether the UWB signal includes a privacy setting associated with the user. Furthermore, in response to the UWB signal including the privacy setting and the privacy setting indicating that the communicatively coupled device is enabled for communication, initiating a communication between the system and the device.

Generally, the embodiments may take form of software, hardware, or combinations thereof. More specifically, the embodiments may be configured to perform location-aware augmented reality tasks utilizing software and/or hardware components. For example, and not by limitation, a general embodiment may include an AR system. The system may include an UWB communication system configured to estimate location information.

The UWB system can include a memory and a processor which when executing instructions from the memory is configured to perform operations and methods consistent with location-aware AR applications.

Figure 4:
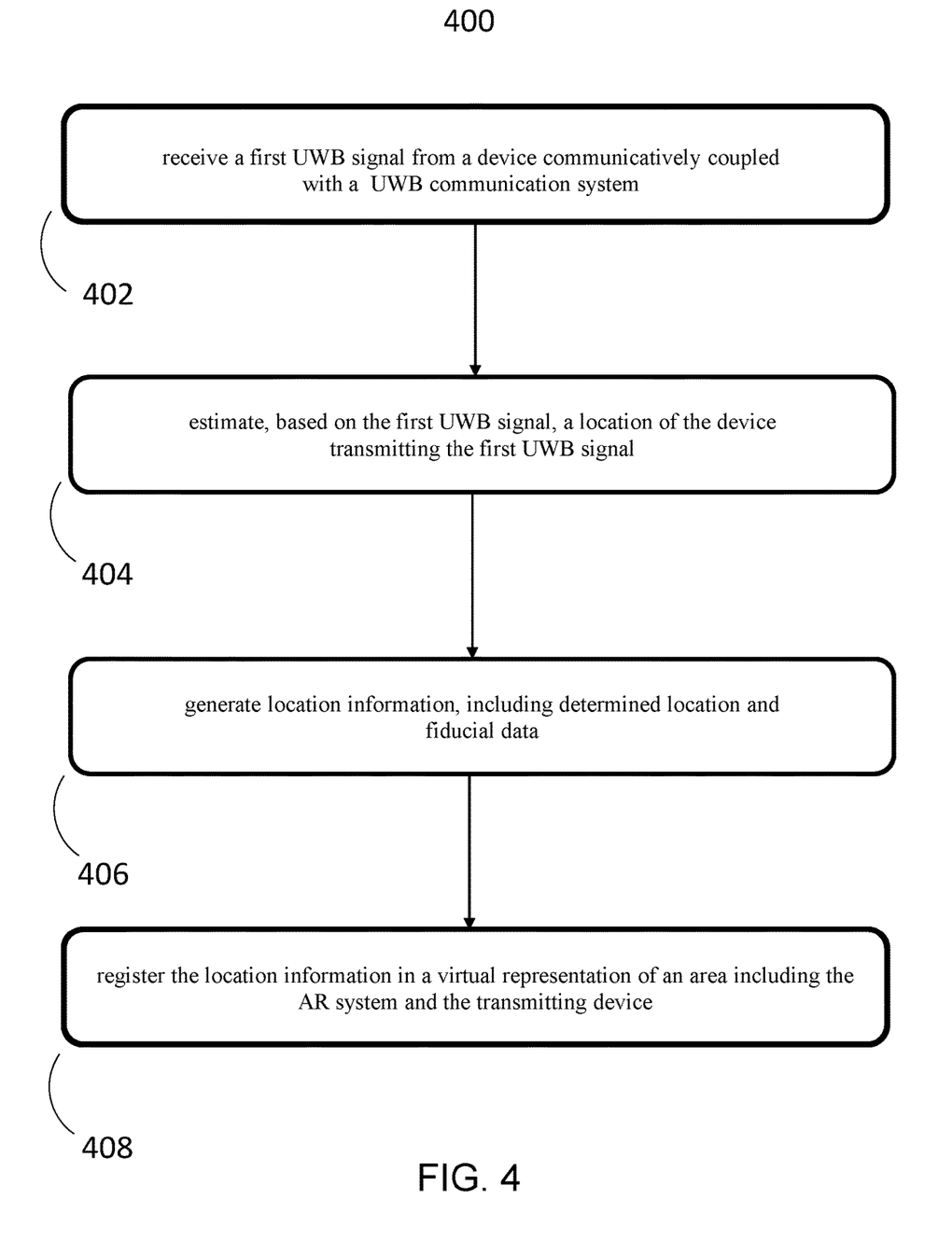
FIG. 4 illustrates a flowchart of an exemplary method for practicing an embodiment of the present disclosure.

For example, FIG. 4 is a flowchart of an exemplary method 400 of practicing an embodiment of the present disclosure. The method 400 may include a block 402 receiving a first UWB signal, the first UWB signal including information comprising fiducial data associated with a device transmitting the first UWB signal.

The method 400 may further include estimating in block 404, based on the first UWB signal, a location of the device transmitting the first UWB signal. Furthermore, the method 400 can include generating location information, including the determined location and the fiducial data in block 406. The method 400 may also include registering, in block 408, the location information in a virtual representation of an area comprising the AR system and the device transmitting the first UWB signal.

The AR system can further include a radio system configured to operate as a UWB transceiver, and the radio system may be configured to receive the first UWB signal and transmit a second UWB signal. The second UWB signal can include fiducial data associated with the AR system. The second UWB signal may include data representative of a current location of the AR system in the virtual representation of the area.

The operations may further include dynamically requesting the device to transmit the first UWB signal in order to continually update the location information. The operations can further include establishing a handshaking protocol between the AR system and the device transmitting the first UWB signal.

The handshaking protocol may include one or all of the following operations: (i) sending a request to the device to transmit the first UWB signal and (ii) sending an acknowledgement message to the device that the first UWB signal has been received. Furthermore, estimating the location can include determining a received signal strength indicator (RSSI) for the first UWB signal. Alternatively, estimating the location can include performing a time-of-flight operation based on a handshaking protocol between the AR system and the device transmitting the first UWB signal.

In yet another embodiment, instructions from the memory can configured the processor to perform another set of operations. For example, the operations can include receiving a first UWB signal, the first UWB signal including information comprising fiducial data associated with a device transmitting the first UWB signal, and the operations can include effecting, based on the first UWB signal and the fiducial data, a change in a configuration of the AR system.

The fiducial data can include an identifier associated with a user of the device transmitting the first UWB signal, and the change in the configuration can be associated with the identifier. The change in the configuration can be based on a location of the device transmitting the first UWB signal and an identifier included in the fiducial data. The identifier may be specific to a user of the device transmitting the first UWB signal. The operations can further include estimating a location of the device transmitting the first UWB signal. Effecting the change in the configuration may be based on the location being within a predetermined location threshold which may be associated with a distance between the AR system and the device.

In an additional example, there may be provided a software embodiment configured to provide location-aware AR capability. The software may be defined by a method for updating a virtual representation in an augmented reality system. The method may include receiving, by a UWB communication system, a first UWB signal including data indicative of a fiducial of a communication device. The method may further include estimating, based on the first UWB signal, a location of the communication device. The method may further include updating the virtual representation with the location of the communication device.

The method may further include determining an RSSI and estimating the location may include performing a time-of-flight operation. The method may include estimating a distance and an angle from another device registered in the virtual representation.

In yet other embodiments, the teachings set forth herein yield an AR system capable of performing opt-in AR discoverability. For instance, there is provided a including a memory and a processor which, when executing instructions from the memory, is configured to perform certain operations. The operations can include receiving a message indicative of a profile specific to a user of the AR system. The operations can further include configuring, based on the message, UWB communication system of the AR system such that the AR system is discoverable by another UWB communication system.

The operations can include receiving the message via an I/O device of the AR system, and the message may originate from a device communicatively coupled to the AR system. The system and the device may be connected via the Internet, e.g., via a Wi-Fi. In the alternative, the AR device may be communicatively coupled to the AR system via a UWB communication link or via a local area network (LAN).

Furthermore, the UWB communication system may be configured to periodically emit an UWB identification signal, and the UWB identification signal may include an identifier specific to the AR system. The identifier may include data that are specific to the user of the AR system.

In another embodiment, there is provided a system that can include a memory and a processor configured to perform certain operations when executing instructions from the memory. These operations may include receiving a message indicative of a profile specific to a user of the system, and configuring, based on the message, a UWB communication module of the system such that the system nay be discoverable by another device. Furthermore, the operations may include updating, in response to the configuring, a virtual representation of a location of the system to include the system.

The operations can further include causing the UWB communication module of the system to broadcast a UWB identification signal. The system may be communicatively coupled to the AR system, and the virtual representation may be generated by the AR system. The UWB identification signal can include an identifier specific to the user of the system. The UWB identification signal can further includes another identifier specific to the system.

Yet another embodiment provides software methods for opt-in UWB communication capability. For instance, an exemplary method may include receiving, by a system such as the exemplary systems described above, a message indicating a user's preference for the system to be discoverable by a device communicatively coupled to the system. The method may include configuring, by the system, a UWB communication module of the system. The configuring can include generating an identifier indicative specific to the system and specific to the user and broadcasting a UWB signal including the identifier.

The method may further include, upon receiving the message, issuing a command to a communicatively coupled AR system to update a virtual representation of a location of the system. The method may further include updating the virtual representation to include a virtual item representing the system within the virtual representation. Furthermore, the broadcasting can intermittently emit the UWB signal periodically or intermittently.

In still another embodiment, there is provided a system including a memory and a processor configured to execute instructions from the memory. The processor may perform certain operations upon executing the instructions from the memory. These operations may include receiving a UWB signal from a communicatively coupled device, where the communicatively coupled device is associated a user.

The operations can further include determining whether the UWB signal includes a privacy setting associated with the user. In response to the UWB signal including the privacy setting and the privacy setting indicating that the communicatively coupled device is enabled for communication, the operations can include initiating a communication between the system and the device.

The operations can further include performing a facial-recognition operation of the user upon verifying the privacy settings. Alternatively, the operations can further include performing a retinal scan of the user when the privacy setting is verified. The operations can also include updating a virtual representation of a location of the device with a virtual identifier corresponding to the user. The virtual identifier can be an avatar.

Furthermore, in response to the UWB signal including the privacy setting and the privacy setting indicating that the communicatively coupled device is enabled for communication, the operations can further include performing a change in configuration of the system. The change in configuration can be specific to the user. For example, the change may be associated with previously set preferences for the user. The operations can further include effecting the change in configuration based on an identifier associated with the user and the identifier can be included in the UWB signal.

Another embodiment provides a method for use with a system configured for UWB communication. The method includes receiving, by the system, a UWB signal from a communicatively coupled device, the communicatively coupled device being associated a user. The method also includes determining, by the system, whether the UWB signal includes a privacy setting associated with the user.

In response to the UWB signal including the privacy setting and the privacy setting indicating that the communicatively coupled device is enabled for communication, initiating, by the system, a communication between the system and the device. The method also includes, in response to the UWB signal, including the privacy setting and the privacy setting indicating that the communicatively coupled device is enabled for communication performing a facial-recognition operation of the user.

The method can further include performing a retinal scan of the user. The method further includes updating a virtual representation of a location of the device with a virtual identifier corresponding to the user. The virtual identifier may be an avatar. The method further includes, in response to the UWB signal including the privacy setting and the privacy setting indicating that the communicatively coupled device is enabled for communication, performing a change in configuration of the system. The change in configuration may be specific to the user. The method further includes effecting the change in configuration based on an identifier associated with the user. The identifier may be included in the UWB signal. The identifier may be encrypted, and the method may further include decrypting the identifier.

In yet another embodiment, there is provided a system that includes a memory and processor which, when executing instructions from the memory, is configured to perform certain operations. These operations can include receiving a first UWB signal from a device communicatively coupled with the system, the first UWB signal including an identifier of the device. The operations can further include determining whether the first UWB signal includes data indicating that the device is allowed to initiate a communication with the system. Furthermore, in response to the device being allowed to communicate the system, the operations can include receiving a second UWB signal from the device, the second UWB signal including an audio signal. The operations can further include activating an audio module of the system and playing the audio signal on the audio module.

The system may be further configured to estimate a distance between the system and the device, and the system may be further configured to adjust a volume of the audio signal for playback on the audio module based on the distance. The operations can further comprise configuring the audio module prior to playing the audio signal on the audio module, and the configuring may be effected based on a preference setting of a user associated with the system. Generally, the audio module may be a hearing aid device, or it may be part of a hearing aid device. In an alternate embodiment, the audio module may be part of an augmented reality or a virtual reality headset.

The system may be further configured to transmit a third UWB signal to the device, and the third UWB signal may include another audio signal being captured by an audio capture module of the system. The audio capture module of the system can include a microphone.

Figure 5:
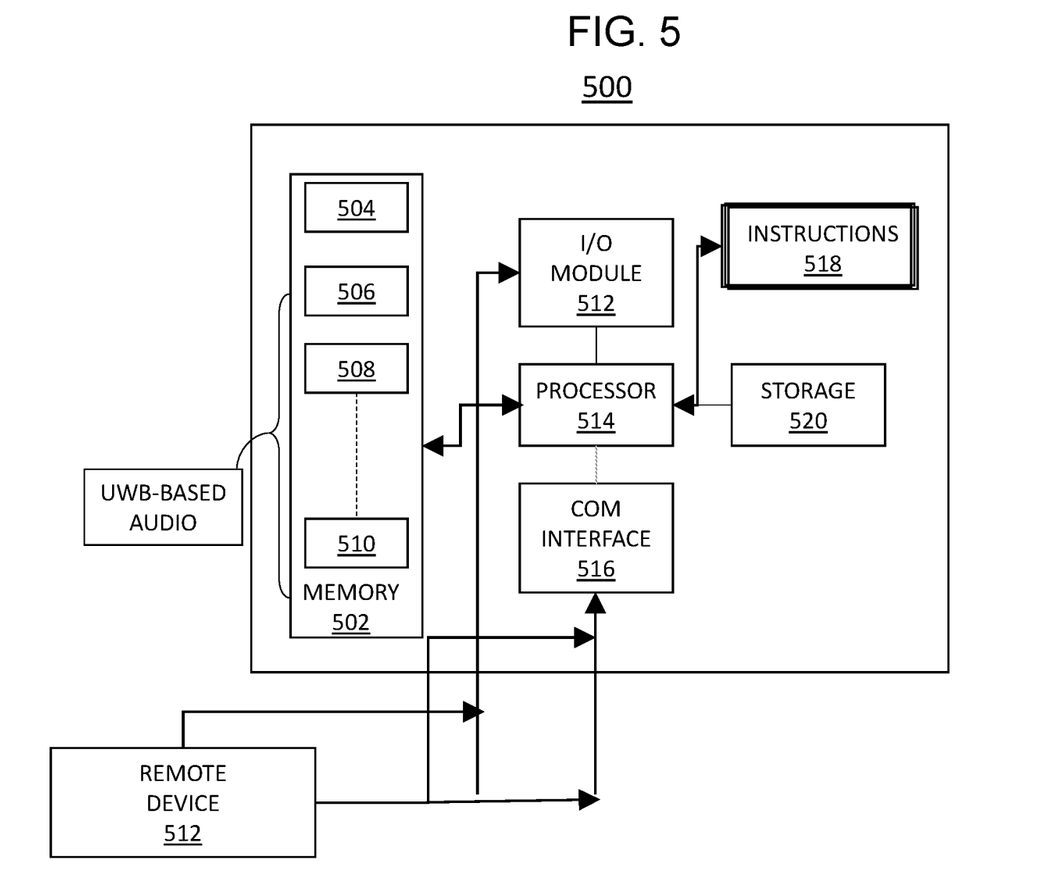
FIG. 5 illustrates an AR system for audio transmission based on UWB communications.

An embodiment may also provide a method in the form of software that may be used with one of the aforementioned systems. The method may include receiving a first UWB signal from a device communicatively coupled with the system, indicted in step 502, the first UWB signal including an identifier of the device. The method may further include determining whether the first UWB signal includes data indicating that the device is allowed to initiate a communication with the system.

In response to the device being allowed to communicate the system, the method may include receiving a second UWB signal from the device, the second UWB signal including an audio signal. The method may further include activating an audio module of the system and playing the audio signal on the audio module.

The method may further include estimating a distance between the system and the device. Further including adjusting a volume of the audio signal for playback on the audio module based on the distance. The method may further include configuring the audio module prior to playing the audio signal on the audio module. Further including configuring the system based on a preference setting of a user associated with the system. The audio module is a hearing aid. The audio module is part of an augmented reality or a virtual reality headset. The method may further include transmitting a third UWB signal to the device, and the third UWB signal may include another audio signal being captured by an audio capture module of the system.

FIG. 5 depicts a system 500 that may be used to implement UWB-based audio communication. The system 500 includes an application-specific processor 514 configured to perform tasks relating to UWB and AR discoverability, with particular applications to audio signal transmission. The processor 514 has a specific structure imparted by instructions stored in a memory 502 and/or by instructions 518 that can be fetched by the processor 514 from a storage 520. The storage 520 may be co-located with the processor 514, or it may be located elsewhere and be communicatively coupled to the processor 514 via a communication interface 516.

The system 500 can be a stand-alone programmable system, or it can be a programmable module located in a much larger system. For example, the system 500 may be part of a distributed system configured to handle the various modules of an AR system. The processor 514 may include one or more hardware and/or software components configured to fetch, decode, execute, store, analyze, distribute, evaluate, and/or categorize information.

Furthermore, the processor 514 can include an input/output module (I/O module 512) that can be configured to receive and/or transmit data to or from one or more UWB-enabled communicatively devices. The processor 514 may include one or more processing devices or cores (not shown). In some embodiments, the processor 514 may be a plurality of processors, each having either one or more cores. The processor 514 can be configured to execute instructions fetched from the memory 502, i.e. from one of memory block 504, memory block 506, memory block 508, and memory block 510.

Furthermore, without loss of generality, the storage 520 and/or the memory 502 may include a volatile or non-volatile, magnetic, semiconductor, tape, optical, removable, non-removable, read-only, random-access, or any type of non-transitory computer-readable computer medium. The storage 520 may be configured to log data processed, recorded, or collected during the operation of the processor 514. The data may be time-stamped, location-stamped, cataloged, indexed, or organized in a variety of ways consistent with data storage practice. The storage 520 and/or the memory 502 may include programs and/or other information that may be used by the processor 514 to perform tasks consistent with those described herein.

For example, the processor 514 may be configured by instructions from the memory block 506, the memory block 508, and the memory block 510, to perform privacy-based audio signal transmission and communication based on UWB connectivity. These operations may be codified in the memory 502 as instructions, and the instructions may include receiving a first UWB signal from a device 512 communicatively coupled with the system 500, the first UWB signal including an identifier of the device 512.

The operations can further include determining whether the first UWB signal includes data indicating that the device 512 is allowed to initiate a communication with the system 500. Thus, in response to the device 512 being allowed to communicate the system 500, the operations can include receiving a second UWB signal from the device 512, the second UWB signal including an audio signal. The operations can then include activating an audio module of the system 500 and playing the audio signal on the audio module of the system 500.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. An augmented reality (AR) system, comprising:
an ultra-wide band (UWB) communication system configured to determine location information, the UWB system comprising:
a memory;
a processor, which when executing instructions from the memory, is configured to perform operations comprising:
receiving a first UWB signal, the first UWB signal comprising information comprising fiducial data associated with a device transmitting the first UWB signal;
determining, based on the first UWB signal, a location of the device transmitting the first UWB signal;
generating location information comprising the determined location and the fiducial data; and
registering the location information in a virtual representation of an area comprising the AR system and the device transmitting the first UWB signal.

2. The AR system of claim 1, further comprising a radio system configured to operate as a UWB transceiver, the radio system further being configured to receive the first UWB signal and transmit a second UWB signal, the second UWB signal including second fiducial data associated with the AR system.

3. The AR system of claim 2, wherein the second UWB signal comprises data representative of a current location of the AR system in the virtual representation of the area.

4. The AR system of claim 1, wherein the operations further comprise:
dynamically requesting the device to transmit the first UWB signal in order to continually update the location information.

5. The AR system of claim 1, wherein the operations further comprise establishing a handshaking protocol between the AR system and the device transmitting the first UWB signal.

6. The AR system of claim 1, wherein a handshaking protocol comprises one or more of the following operations: (i) sending a request to the device to transmit the first UWB signal, or (ii) sending an acknowledgement message to the device that the first UWB signal has been received.

7. The AR system of claim 1, wherein determining the location comprises determining a received signal strength indicator (RSSI) for the first UWB signal.

8. The AR system of claim 1, wherein determining the location comprises performing a time-of-flight operation based on a handshaking protocol between the AR system and the device transmitting the first UWB signal.

9. An augmented reality (AR) system, comprising:
an ultra-wide band (UWB) communication system, the UWB communication system comprising:
a memory;
a processor, which when executing instructions from the memory, is configured to perform operations comprising:
receiving a first UWB signal, the first UWB signal comprising information comprising fiducial data associated with a device transmitting the first UWB signal;
determining, based on the first UWB signal, a location of the device; and effecting, based on the first UWB signal and the fiducial data, a change in a configuration of the AR system.

10. The AR system of claim 9, wherein the fiducial data comprises an identifier associated with a user of the device transmitting the first UWB signal.

11. The AR system of claim 10, wherein the change in the configuration is associated with the identifier.

12. The AR system of claim 9, wherein the change in the configuration of the AR system is based on the location of the device transmitting the first UWB signal and an identifier included in the fiducial data.

13. The AR system of claim 12, wherein the identifier is specific to a user of the device transmitting the first UWB signal.

14. The AR system of claim 9, wherein the operations further comprise performing the effecting the change in the configuration based on determining the location of the device, transmitting the first UWB signal, being within a predetermined location threshold associated with a distance between the AR system and the device.

15. The AR system of claim 9, wherein the operations further comprise effecting the change in the configuration based on the location being within a predetermined location threshold.

16. The AR system of claim 15, wherein the predetermined location threshold is based on a determined distance between the AR system and the device.

17. A method for updating a virtual representation in an augmented reality (AR) system, the method comprising:
    receiving, by an ultra-wideband (UWB) communication system, a first UWB signal comprising data indicative of a fiducial of a communication device;
    determining, based on the first UWB signal, a location of the communication device;
    updating the virtual representation with the location of the communication device; and
    effecting, based on the first UWB signal and the data indicative of the fiducial, a change in a configuration of the AR system.

18. The method of claim 17, wherein determining the location comprises determining a received signal strength indicator (RSSI).

19. The method of claim 17, wherein determining the location comprises performing a time-of-flight operation.

20. The method of claim 17, wherein the location comprises a distance and an angle from another device registered in the virtual representation.

* * * * *

UNITED STATES PATENT AND TRADEMARK OFFICE
CERTIFICATE OF CORRECTION

| | | |
|---|---|---|
| PATENT NO. | : 11,799,967 B1 | Page 1 of 1 |
| APPLICATION NO. | : 17/559748 | |
| DATED | : October 24, 2023 | |
| INVENTOR(S) | : William Lott | |

It is certified that error appears in the above-identified patent and that said Letters Patent is hereby corrected as shown below:

On the Title Page

Item (73) Assignee:
Please replace "Meta Platforms, Inc." with -- Meta Platforms Technologies, LLC --

Signed and Sealed this
Thirtieth Day of April, 2024

*Katherine Kelly Vidal*

Katherine Kelly Vidal
*Director of the United States Patent and Trademark Office*